(12) United States Patent
Swaminathan et al.

(10) Patent No.: US 11,346,212 B2
(45) Date of Patent: May 31, 2022

(54) METHOD FOR MONITORING AND CONTROLLING CLUSTER EFFICIENCY

(71) Applicant: Halliburton Energy Services, Inc., Houston, TX (US)

(72) Inventors: Tirumani N. Swaminathan, Houston, TX (US); Dinesh Ananda Shetty, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 310 days.

(21) Appl. No.: 16/597,440

(22) Filed: Oct. 9, 2019

(65) Prior Publication Data
US 2021/0108509 A1    Apr. 15, 2021

(51) Int. Cl.
| | | |
|---|---|---|
| *E21B 47/10* | (2012.01) | |
| *E21B 47/12* | (2012.01) | |
| *E21B 43/26* | (2006.01) | |
| *G06F 30/20* | (2020.01) | |
| *G06F 111/10* | (2020.01) | |

(52) U.S. Cl.
CPC ............. *E21B 47/10* (2013.01); *E21B 43/26* (2013.01); *E21B 47/12* (2013.01); *G06F 30/20* (2020.01); *G06F 2111/10* (2020.01)

(58) Field of Classification Search
CPC .......... E21B 47/10; E21B 47/12; E21B 43/26; E21B 43/2607; E21B 2200/20; G06F 30/20; G06F 2111/10
See application file for complete search history.

(56) References Cited

U.S. PATENT DOCUMENTS 9,938,815 B2    4/2018 Samuel et al.

FOREIGN PATENT DOCUMENTS

| WO | 2018048415 A1 | 3/2018 |
| WO | 2018143918 A1 | 8/2018 |

OTHER PUBLICATIONS

Hussain et al., Understanding the True Stimulated Reservoir Volume in Shale Reservoirs, Apr. 24-27, 2017, SPE Kingdom of Saudi Arabia Annual Technical Symposium and Exhibition, Dammam, Saudi Arabia, 11 pp. (Year: 2017).*

* cited by examiner

*Primary Examiner* — Toan M Le
(74) *Attorney, Agent, or Firm* — John W. Wustenberg; Parker Justiss, P.C.

(57) ABSTRACT

The disclosure provides a method and a computer program product for determining distribution of fracturing components in fracture clusters of a wellbore, and a fracturing controller. An example of the method includes: (1) modifying surface flow rates for pumping a fracturing component into the wellbore, (2) measuring surface pressures for the surface flow rates, and (3) determining flow rates for the fracture clusters employing the surface flow rates, the surface pressures, and a model representing flow distribution of the wellbore. An example fracturing controller includes (1) an interface configured to receive surface flow rates and corresponding surface pressures for pumping a fracturing component into a wellbore, wherein the surface flow rates are modified in a series of steps, and (2) a processor configured to determine flow rates for the fracture clusters employing the surface flow rates, the surface pressures, and a model representing flow distribution of the wellbore.

16 Claims, 4 Drawing Sheets

METHOD FOR MONITORING AND CONTROLLING CLUSTER EFFICIENCY

BACKGROUND

Hydraulic fracturing is a type of well stimulation for hydrocarbon recovery whereby well productivity is increased by creating fractures in the subterranean formation around a wellbore. A hydraulic fracturing process can include multiple treatment stages wherein various types of fracturing components, such as fracture fluids, solids, proppants, chemicals, diverter material, or a combination thereof, are pumped into the wellbore to aid in the hydraulic fracturing. The effectiveness of the products pumped into the wellbore can vary due to the properties of the subterranean formation and the properties of the fracturing components pumped into the wellbore. One factor that ties into its effectiveness is the distribution of the fracturing components among fracture clusters. Knowing how the fracturing components will be distributed through the fracture clusters and how that relates to achieving the goal of hydraulic fracturing treatment stages would be beneficial.

SUMMARY

In one aspect, a method of determining distribution of fracturing components in fracture clusters of a wellbore is disclosed. In one example, the method includes: (1) modifying surface flow rates for pumping a fracturing component into the wellbore, (2) measuring surface pressures for the surface flow rates, and (3) determining flow rates for the fracture clusters employing the surface flow rates, the surface pressures, and a model representing flow distribution of the wellbore.

In another aspect, a fracturing controller for hydraulic fracturing of subterranean regions is disclosed. In one example, the fracturing controller includes: (1) an interface configured to receive surface flow rates and corresponding surface pressures for pumping a fracturing component into a wellbore, wherein the surface flow rates are modified in a series of steps, and (2) a processor configured to determine flow rates for the fracture clusters employing the surface flow rates, the surface pressures, and a model representing flow distribution of the wellbore.

In yet another aspect, the disclosure provides a computer program product having a series of operating instructions stored on a non-transitory computer-readable medium that directs a processor when executed thereby to perform operations to determine a distribution of fracture fluids in fracture clusters of a wellbore. In one example the operations include: (1) receiving surface flow rates for pumping a fracture fluid into the wellbore, wherein the surface flow rates are modified in a series of steps, (2) receiving surface pressures measured for each of the series of steps, and (3) determining flow rates for the fracture clusters employing the surface flow rates, the surface pressures, and a model representing flow distribution of the wellbore.

BRIEF DESCRIPTION

Reference is now made to the following descriptions taken in conjunction with the accompanying drawings, in which.

DETAILED DESCRIPTION

Figure 1:
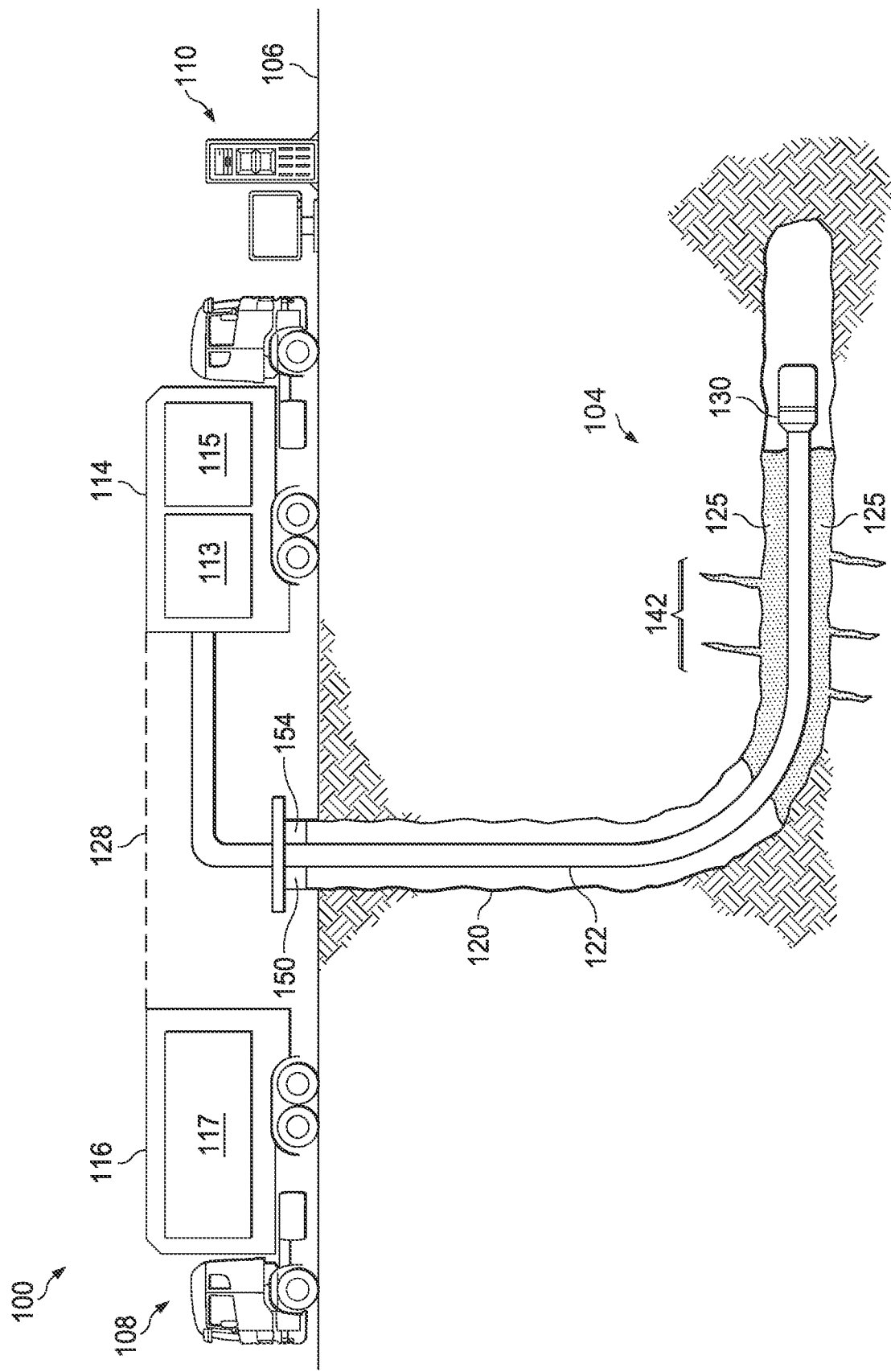
FIG. 1 is an illustration of a diagram of hydraulic fracturing (HF) well system, which can be a well site where HF operations are occurring through the implementation of a HF treatment stage plan.

Even though knowing the distribution of the fracturing components within the fracture clusters can be beneficial, determining if and how the downhole fracturing process is working is difficult due to the lack of direct observation. Ideally, an operator would like to balance the amount of fracturing components, such as fracture fluid and proppant, placed in each of the multiple fractures that have been created. In practice, however, this can be difficult due to monitoring where the fracture fluid and the proppant is going downhole in each of the fractures or fracture clusters. A downhole monitoring system, like a distributed acoustic sensing (DAS) system, can be helpful to monitor the fracturing process. Employing such a system, however, can be costly.

This disclosure addresses monitoring, evaluating, and controlling a fracturing process that can be used to balance the distribution of fracturing components in a multi-cluster fracturing stage. A series of steps can be performed to determine the distribution of fracturing components going into the fracture clusters. Parameters representing the well characteristics can be evaluated and then can be used via, for example, control techniques, to assist in distribution of the fracturing components to obtain a desired result for a fracturing process. The fracturing components can be fracture fluid, proppant, diversion material or chemicals like surfactants, acids etc. In one example, the disclosed process involves pumping fracture fluid at the start of a fracture, varying the pumping rates in steps, such as a series of rate-quick steps, in order to understand properties downhole, such as those associated with the perforation and tortuosity, starting proppant delivery, and continuing to monitor and control the cluster efficiency. Through the process, information is obtained at the surface that can be used to evaluate what is happening downhole that cannot be directly observed. The disclosed method and system advantageously allows monitoring the individual distribution of fracturing components into various fracture clusters without having to install a downhole monitoring system, such as a DAS system. A fracking controller can be configured to automatically capture the downhole conditions and provide cluster optimization for a fracturing process.

The method and system disclosed herein determine flow rates for fracture clusters employing the surface flow rates, the surface pressures, and a model representing the well bore physical phenomena. The flow distribution model is based on a set of non-linear relationships that include a relationship of a cluster flow rate to a cluster entrance pressure, a relationship of a surface flow rate to the flow rates for each of the fracture clusters, and the relationship between a cluster entrance pressure to friction and hydrostatic pressure associated with the known fracturing component being pumped into the wellbore. For a fracturing stage with n clusters, the relationships can be represented by a set of non-linear equations such as Equations 1, 2, and 3 presented below.

For each cluster i, the entrance pressure can be described by Equation 1:

$$P_i(t) = C_{p,i} q_i(t)^2 + C_{t,i}\sqrt{q_i(t)} + \sigma_i +$$  Equation 1 where $q_i$ represents the flow rate through a cluster i, $C_{p,i}$ is the perforation loss coefficient, $C_{t,i}$ is the tortuosity loss coefficient, and $\sigma_i$ is the effective stress. The flow variables, $q_i$, vary with both time and cluster, whereas the other variables on the right hand side of Equation 1, the perforation loss coefficient $C_{p,i}$ and the tortuosity loss coefficient $C_{t,i}$ are assumed to be time invariant that vary from cluster to cluster.

For the fracturing stage with n clusters, an additional constraint is also employed as represented by Equation 2:

$$\Sigma q_i(t) = Q_{in}$$  Equation 2 where $Q_{in}$ is the surface flow rate which holds true under the assumption of mass balance.

An additional relationship for the model is represented by Equation 3:

$$P_i = P_f + \text{Fric}_{ij} - \Delta H_{ij} \rho g$$  Equation 3 where $P_i$ is the pressure at the entrance of the cluster i, $P_j$ is the surface pressure, $\text{Fric}_{ij}$ is a known friction for a fluid that is being pumped at the surface, and $H_{ij} \rho g$ is the hydrostatic pressure that is known, or can be calculated based on the fracturing component being pumped and the location of the fracture cluster. Using the assumption that the frictional and hydrostatic variations are negligible in comparison to the pressure losses in Equation 1, pressure equality at the entrance to each cluster can be assumed.

To determine the unknown cluster flow rates, the disclosure employs a procedure wherein pressure response measurements are obtained for changing flowrates at the surface. To determine the number of measurements that are needed, $n_x$ can be set to the number of time invariant variables in Equation 1 and $n_{cluster}$ can be set to the number of clusters in the current fracturing treatment stage. For example, if $n_x * n_{cluster}$ pressure response measurements are obtained for flowrates, then Equations 1, 2, and 3, can be solved for all the unknown cluster flow rates and cluster variables. Accordingly, the flow rate through the clusters can be determined without having to install a downhole monitoring system. The number of measurements can be reduced with further simplifications. For example, the effective stress $\sigma_i$ variation from cluster to cluster can be negligible for the fracture treatment stage.

Turning now to the figures, FIG. 1 is an illustration of a diagram of hydraulic fracturing (HF) well system 100, which can be a well site where HF operations are occurring through the implementation of a HF treatment stage plan. The HF well system 100 includes a fracturing system 108 and a computing system 110. The HF well system 100 also includes a wellbore 120 in a subterranean region 104 beneath the ground surface 106. The wellbore 120 includes a horizontal portion but may include any combination of horizontal, vertical, slant, curved, or other wellbore orientations. The HF well system 100 can also include one or more additional treatment wells, observation wells, or other types of wells. Furthermore, the HF well system 100 can include additional or different features, and the features of the well system can be arranged as shown in FIG. 1 or in another configuration.

The subterranean region 104 may include a reservoir that contains hydrocarbon resources, such as oil or natural gas. For example, the subterranean region 104 may include all or part of a rock formation (e.g., shale, coal, sandstone, granite, or others) that contains natural gas. The subterranean region 104 may include naturally fractured rock or natural rock formations that are not fractured to any significant degree. The subterranean region 104 may include tight gas formations that include low permeability rock (e.g., shale, coal, or others).

The fracturing system 108 can be used to perform a fracturing treatment or treatments of hydraulic fracturing whereby a fracturing component is injected into the subterranean region 104 to fracture part of a rock formation or other materials in the subterranean region 104. In such examples, fracturing the rock may increase the surface area of the formation, which can increase the rate at which the formation conducts hydrocarbon resources to the wellbore 120.

The fracturing system 108 may apply different types of fracture treatment stages and can apply the different types of stages multiple times. For example, the fracturing system 108 can apply fracturing treatment stages and low rate treatment stages. A fracturing treatment stage is created by injecting a fracturing component, such as a polymer gelled-water slurry, fracture fluid with sand proppant, down a wellbore, such as wellbore 120, and into a targeted reservoir interval at an injection rate and pressure sufficient to cause the reservoir rock within the selected depth interval to fracture in a perpendicular plane passing through the wellbore. The proppant in the fracturing fluid is used to prevent fracture closure after completion of the fracturing treatment. A low rate treatment stage is when the fracturing fluid is injected down the wellbore at a reduced pump rate that allows fractures to start closing (the injecting fluid volume is less than the fluid volume leaking through created fracture (s) faces). Pump trucks 114 can be used to pump the fracture fluid into the wellbore 120.

In addition to the pump trucks 114, the fracturing system 108 includes a pump controller 115, instrument trucks 116, a fracturing controller 117, and a communication link 128. The HF well system 100 or the fracturing system 108 specifically can include multiple uncoupled communication links or a network of coupled communication links that include wired or wireless communications systems, or a combination thereof. The fracturing system 108 includes a surface flow rate meter 150 and a surface pressure meter 154 that can be used to measure or verify the HF flow rate and the HF pressure at the surface 106 for the fracturing stages. The fracturing system 108 may include other features that can be included with a fracturing system that are not illustrated herein. For example, the fracturing system 108 may also include other surface and down-hole sensors to measure pressure, rate, temperature or other parameters of fracture treatments.

The pump trucks 114 can include mobile vehicles, immobile installations, skids, hoses, tubes, fluid tanks, fluid reservoirs, pumps, valves, mixers, or other types of structures and equipment. One pump, pump 113, is illustrated in FIG. 1. The pump controller 115 is configured for starting, stopping, increasing, decreasing or otherwise controlling pumping of the fracturing components during the fracturing treatment stages. The pump controller 115 is communicatively coupled to the pump 113 and can be located in the pump trucks 114 as illustrated in FIG. 1 or in another location. The pump trucks 114 shown in FIG. 1 can supply the fracturing components, such as fracture fluid or other materials for the fracture treatments.

The pump trucks 114, including the pump 113, can communicate fracturing components into the wellbore 120 at or near the level of the ground surface 106. The fracturing components can be communicated through the wellbore 120 from the ground surface 106 level by a fluid pipe 122 installed in the wellbore 120. In some implementations, all or a portion of the wellbore 120 may be left open, without casing, while other portions of the wellbore 120 include casing. The fluid pipe 122 may include a working string, coiled tubing, sectioned pipe, or other types of conduit. The bottom portion of fluid pipe 122 has the capability of releasing fracturing component 125, such as carrier fluid with diverter material, from fluid pipe 122 to subterranean formations 104. The release of fracturing component 125 can be by perforations in fluid pipe 122, by valves placed along fluid pipe 122, or by other release means. At the end of fluid pipe 122 is a bottom hole assembly (BHA) 130, which can be one or more downhole tools or an end cap assembly.

The instrument trucks 116 can include mobile vehicles, immobile installations, or other suitable structures. The instrument trucks 116 shown in FIG. 1 include a fracturing controller 117 that controls or monitors the fracture treatments applied by the fracturing system 108. The communication link 128 may allow the instrument trucks 116 to communicate with the pump trucks 114, or other equipment at the ground surface 106. Via the communication links 128 the fracturing controller 117 can communicate with the pump controller 115 to control a flow rate of the fracturing component, such as a fracture fluid into the wellbore 120 and initiate different fracture treatments. Additional communication links may allow the instrument trucks 116 and the fracturing controller 117 to communicate with sensors or data collection devices in the HF well system 100, remote systems, other well systems, equipment installed in the wellbore 120 or other devices and equipment to collect fracturing monitoring information. The fracturing controller 117 can initiate various fracture treatment stages or vary the flow rate of the fracture fluid based on the fracturing monitoring information from the various sensors and data collection devices. The fracturing controller 117 can also direct the pump controller 115 to change the flow rate of the fracture fluid, via the pump 113, into the wellbore 120. The fracturing controller 117 can change the flow rate multiple times and receive the corresponding surface pressure measurement from the surface pressure meter 154 for each of the modified flow rates. As disclosed herein, the surface flow rates and corresponding surface pressure measurements can be used by the fracturing controller 117 for monitoring and controlling fracture cluster efficiency.

The fracturing controller 117 may include data processing equipment, communication equipment, or other systems that control fracture treatments applied to the subterranean region 104 through the wellbore 120. The fracturing controller 117 may be communicably linked to the computing subsystem 110 that can calculate, select, or optimize fracture treatment parameters for initialization, propagation, or opening fractures in the subterranean region 104. The fracturing controller 117 may receive, generate or modify an injection treatment plan (e.g., a pumping schedule) that specifies properties of a fracture treatment to be applied to the subterranean region 104.

In some cases, the fracturing controller 117 can select or modify (e.g., increase or decrease) fluid pressures, fluid densities, fluid compositions, and other control parameters based on data provided by the various sensors or measuring devices. In some instances, fracturing monitoring information or portions thereof can be displayed in real time during fracture treatments to, for example, an engineer or other operator of the HF well system 100. The fracturing monitoring information can be displayed at the fracturing controller 117 or via another display communicatively coupled to the fracturing system 108. The engineer or other operator can use the received information to direct the fracture treatments. The engineer or operator can control the fracture treatments according to the methods and schemes disclosed herein.

The fracturing controller 117 can include an interface configured to receive surface HF flow rates and corresponding HF surface pressures for pumping a fracturing component into the wellbore 120. The interface can receive the HF flow rates, for example, from the pump controller 115 or the surface flow rate meter 150, and HF surface pressures from the surface pressure meter 154. The surface flow rates can be modified in a series of steps as disclosed herein in a method for determining distribution of fracturing components in fracture clusters of a wellbore, and the corresponding surface pressures measured in response to the flow rate changes. The fracturing controller 117 can also include a processor configured to determine flow rates for the fracture clusters employing the surface flow rates, the surface pressures, and a model representing flow distribution of the wellbore 120.

The cluster flow rates can be utilized as input into treatment stage plans, such as for the pumping plan of the treatment stage. The insights gained from the cluster flow rates can be used to modify the treatment stage plan, such as adjusting the mass, frequency, and timing of release, of the proppants and other fracturing components. The fracturing controller 117 can automatically employ the cluster flow rates and time invariant coefficients for fracturing processes.

The computing system 110 can include one or more computing devices or systems located at the wellbore 120 or at other locations. Thus, the computing system 110 can be a distributed system having components located apart from the components illustrated in FIG. 1. For example, the computing subsystem 110 or portions thereof can be located at a data processing center, a computing facility, or another suitable location. The computing system 110 can also include a server, a cloud service, a tablet, a laptop, a smartphone, or other types of computing systems. Computing system 110 can be utilized by a well system engineer and operator for operating the HF well system 100.

Figure 2:
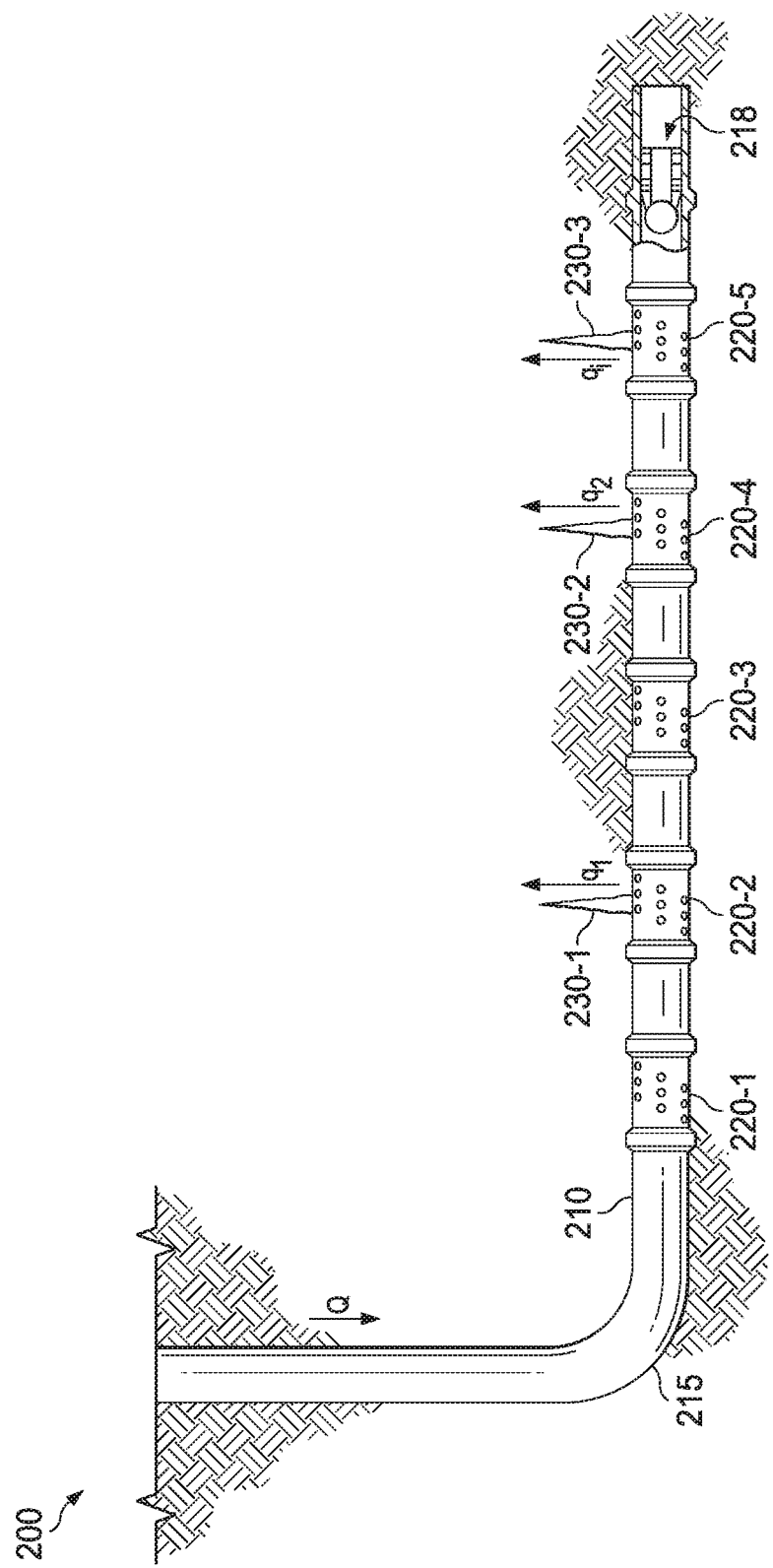
FIG. 2 is an illustration of a diagram of example HF fluid pipe, demonstrating multiple perforation clusters and multiple fracture clusters.

FIG. 2 is an illustration of a diagram of example HF fluid pipe 200, demonstrating multiple perforation clusters and multiple fracture clusters. HF fluid pipe 200 includes a bottom hole assembly (BHA) 218. BHA 218 can be an end cap or BHA 218 can include one or more tools and sensors. HF fluid pipe 200 has a heel 215 where the fluid pipe 200 turns to an approximate horizontal orientation from an original wellbore orientation that extends from the surface. The fluid pipe 200 can be used for the fluid pipe 122 of FIG. 1.

Fluid pipe 200 is capable of providing a path for fracturing components to be pumped from a surface location to a location within a HF wellbore. Fluid pipe 200 includes a perforation cluster 220-1, a perforation cluster 220-2, a perforation cluster 220-3, a perforation cluster 220-4, and a perforation cluster 220-5, collectively identified as perforation clusters 220. Fewer or additional perforation clusters 220 can be part of fluid pipe 200. One or more perforation clusters can be active perforation clusters. Perforation cluster 220-1 can be identified as the first perforation cluster, e.g., nearest the heel 215.

Proximate fluid pipe 200, and extending into the surrounding subterranean formation, is a fracture cluster 230-1, a fracture cluster 230-2, and a fracture cluster 230-3, collectively, fracture clusters 230. Fewer or additional fracture clusters 230 can be part of the subterranean formation. In addition, the orientation of fracture clusters 230 can vary as to what is shown. The number of fracture clusters 230 does not need to match the number of perforation clusters 220.

Fracturing components, such as a fracture fluid, are pumped through fluid pipe 200 to fracture cluster 230 via the active perforation clusters. The fracturing component is pumped at a HF fluid flow rate (Q) and a surface pressure ($P_j$). Q and $P_j$ can be determined from surface equipment, such as the surface flow rate meter 150 and surface pressure meter 154 of FIG. 1. The cluster flows through each of the fracture clusters are indicated in FIG. 2 by $q_1$, $q_2$, $q_i$. The cluster flow rates can be reduced by various factors such as the tortuosity of the HF fluid flow path, i.e., resistance of the subterranean formation, and the HF fluid pressure drop due to friction in the fracture cluster.

Figure 3:
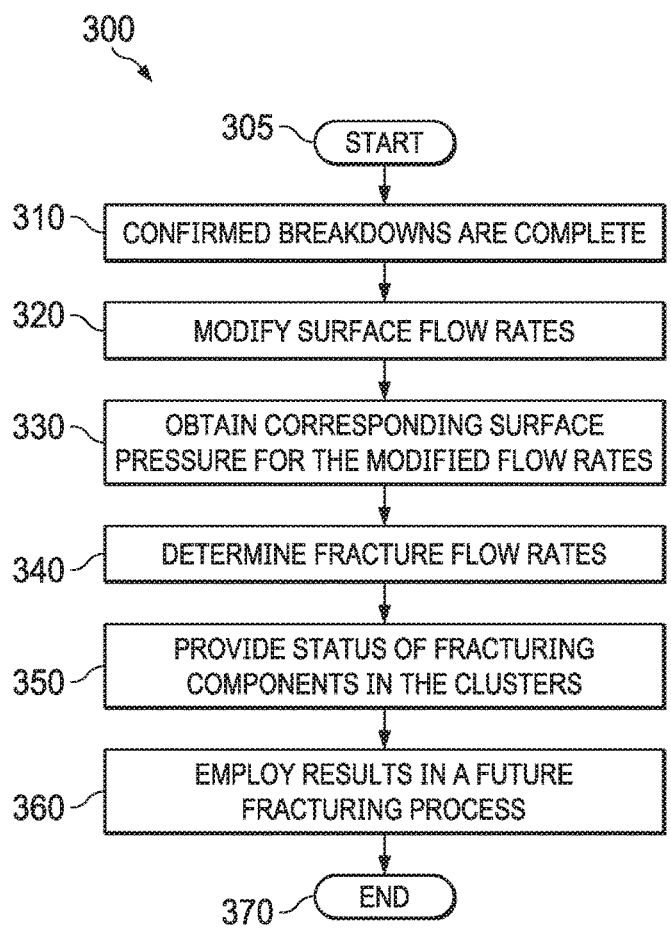
FIG. 3 illustrates a flow diagram of an example of a method for determining distribution of fracturing components in fracture clusters of a wellbore.

FIG. 3 illustrates a flow diagram of an example of a method 300 for determining distribution of fracturing components in fracture clusters of a wellbore. At least some of the steps of the method 300 can be automatically performed or controlled by a fracturing controller such as disclosed herein. The method 300 begins in a step 305.

In a step 310, desired breakdowns of a fracking process are completed. As such, ball-seat, acid, ramp-up, etc., are completed until all of the desired breakdowns are realized. Completions of the breakdowns can be determined by HF surface pressure measurements as typically determined in a fracturing process for treatment stages.

Surface flow rates for pumping a fracturing component into the wellbore are modified in a step 320. The HF surface flow rates can be modified a number of times based on the number of clusters. The number of modifications of the HF surface flow rate can be 2*n+1 where n is the number of clusters, with the assumption that only the perforation loss coefficient and the tortuosity loss coefficients are the significant contributors and the effective stress $\sigma_i$ be the same for each cluster. For example, for a stage with 5 clusters, 10 step downs can be performed to obtain 11 steps. The duration of each step of changing the flow rate can be until the transient variation in pressure vanishes (due to water hammer, etc.), such as in a range of 5 to 20 seconds. For example, the duration can be 10 seconds. Thus, using the 11 steps as an example, step 320 can take approximately 2 minutes. Step 320 can be performed as shown in FIG. 4.

Figure 4:
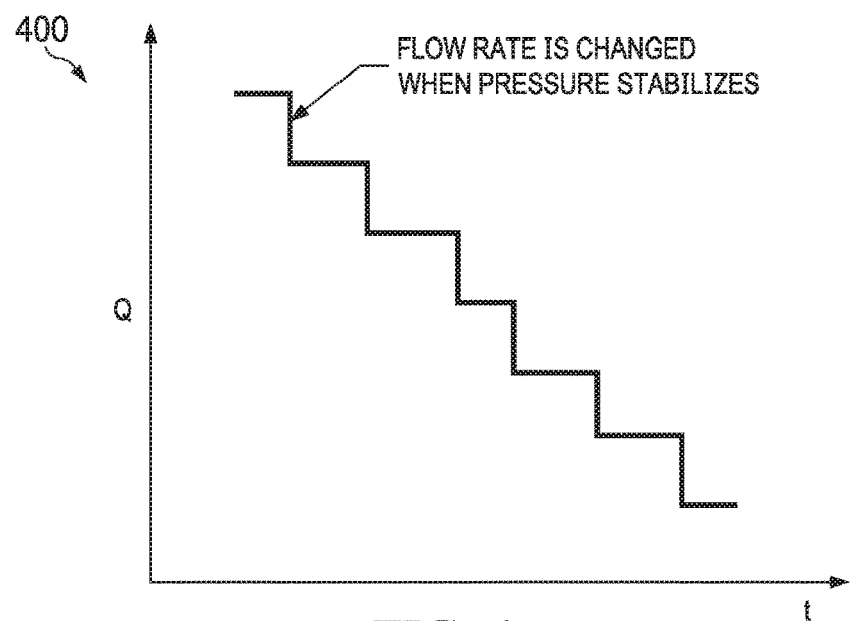
FIG. 4 illustrates a graph wherein the y-axis is the surface flow rate and the x-axis is time.

FIG. 4 illustrates a graph 400 wherein the y-axis is the surface flow rate and the x-axis is time. In graph 400, the flow rate Q is periodically reduced over time at multiple steps having a duration that corresponds to the measured surface pressure. Once the surface pressure is nearly stable, the flow rate is reduced again until a sufficient number of flow rates and corresponding pressure measurements are obtained based on, for example, the number of clusters. Using the example above, until 11 flow rate modifications and pressure measurements have been obtained.

The number of modification steps for the flow rate can be different than 2*n+1. For example, assuming that the minimum horizontal stress is different for each cluster, such as represented in Equation 1, the procedure can be modified to take 3*n steps instead of 2*n+1 steps. For example, for a 5 cluster stage, perform 14 step downs to get 15 steps.

Additionally, the method 300, or at least a portion thereof, can be repeated multiple times. For example, the first iteration of the calibration can be performed with 2n+1 steps and the next iteration with 3*n steps. If the effective stress $\sigma_i$ is different for each cluster, then 3*n steps may be needed. Otherwise only 2*n+1 steps can be utilized. This determination can be done in real time in the field, by doing 3*n steps for the first few times, which leads to the actual estimation of the effective stress. If the stress across the cluster remains close to each other then 2*n+1 steps can be done for subsequent stages.

In a step 330, corresponding surface pressures are measured for each of the flow rates. The surface pressures can be measured for each of the different flow rates. A surface pressure meter can be used to obtain the pressure measurements for each of the surface flow rates. Surface pressure measurements can also be used to determine when to change the surface flow rate.

Flow-rates for the fracture clusters are determined in a step 340 employing the surface flow rates, the surface pressures, and a model representing the flow distribution of the wellbore. The model can be based on relationships that include a relationship of a cluster flow rate to a cluster entrance pressure, a relationship of a surface flow rate to the flow rates for each of the fracture clusters, and the relationship between a cluster entrance pressure to friction and hydrostatic pressure. The model can be a set of non-linear equations that include an equation relating a cluster flow rate to a cluster entrance pressure, and an equation relating a cluster entrance pressure to friction and hydrostatic pressure. The fracture cluster flow rates can be computed by solving the system of non-linear equations. Additionally, coefficients of the model can also be determined in step 340. For example, time invariant coefficients such as the perforation loss coefficient $C_{p,i}$, and the tortuosity loss coefficient $C_{t,i}$, can be computed.

Figure 5:
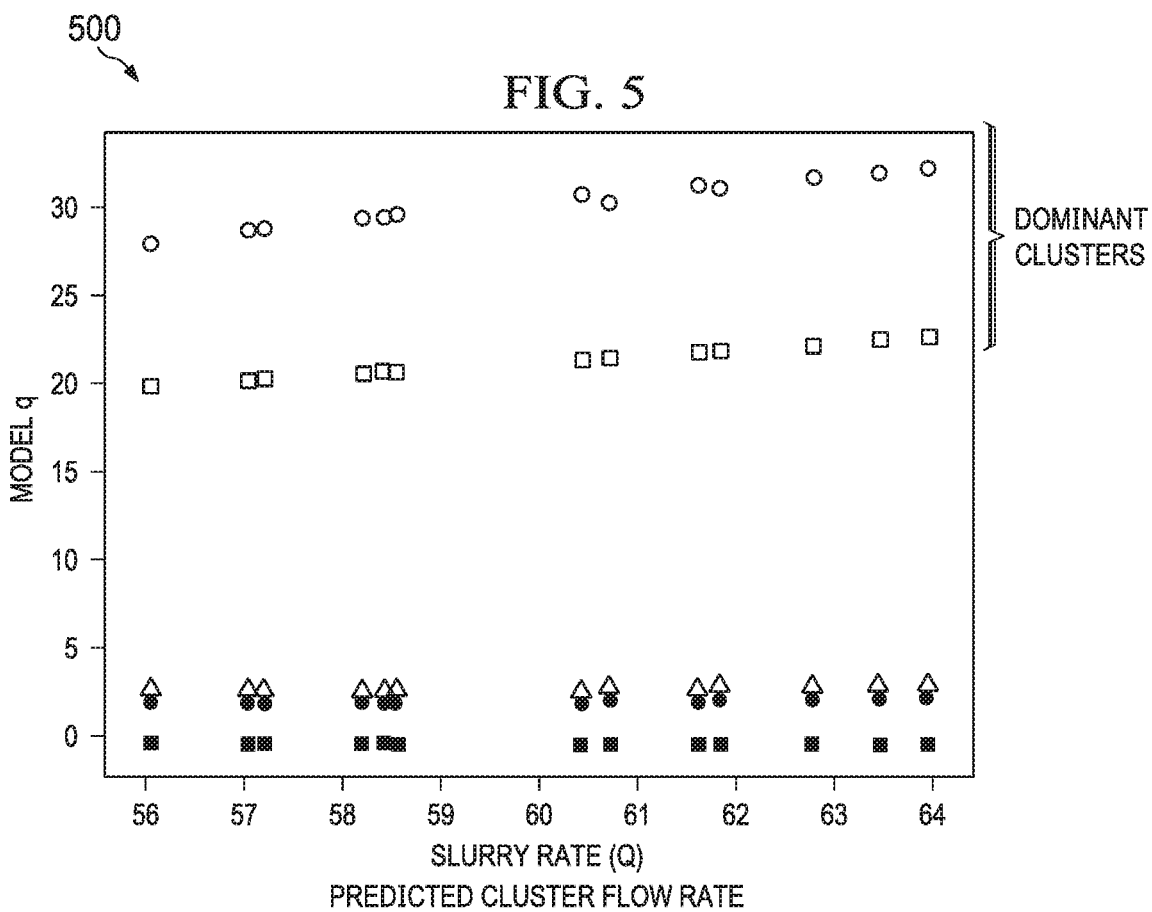
FIG. 5 illustrates one example of a graph for presenting the fracture flow rates by showing the variation of cluster flow rates with respect to the pumping rate.

A status of the fracturing components in the clusters is provided in a step 350. The status is based on the flow rates of the fracture clusters determined in step 340. FIG. 5 illustrates one example of a graph 500 for presenting the fracture flow rates by showing the variation of cluster flow rates with respect to the pumping rate. In this example, the fracture flow rates q on the y-axis are compared with the surface flow rates Q on the x-axis. The surface flow rate Q is also referred to as the slurry rate in FIG. 5. For each of the various surface flow rates, five clusters are identified with each having a different cluster flow rate q. Two dominant clusters are revealed, as identified in the graph 500, and one cluster is identified as having no flow rate. As indicated in Equation 2 above, the sum of the individual cluster flow rates in graph 500 for each of the surface flow rates is equal to that surface flow rate.

The status of the fracturing components can be provided in additional or different formats than the graph 500. For example, the cluster flow rates could be presented as percentages of the overall surface flow rate, as a quality of fracturing component distribution, as a number representing how far from a target distribution, wherein a uniform distribution could be the target.

Returning to the method 300, in a step 360 future fracturing processes can be determined based on the determined coefficients. Once the time invariant coefficients are determined, future predictions can be performed using the same model. Thus a real time, stage dependent optimized pumping schedule or various control schemes, such as a diversion strategy, can be deduced using the method disclosed herein, without use of any other measurements.

The method 300 also provides the individual cluster flow rates for measured intervals, based on surface/bottom hole pressure and the pumping flow rates. These values can be compared against DAS measurements when a DAS system is available, either to compare the accuracy or to improve the DAS methodology. The method can also be used to evaluate limited entry strategy, determine spacing of clusters, determine cluster design, balance out friction, etc.

The method 300 ends in a step 370.

Figure 6:
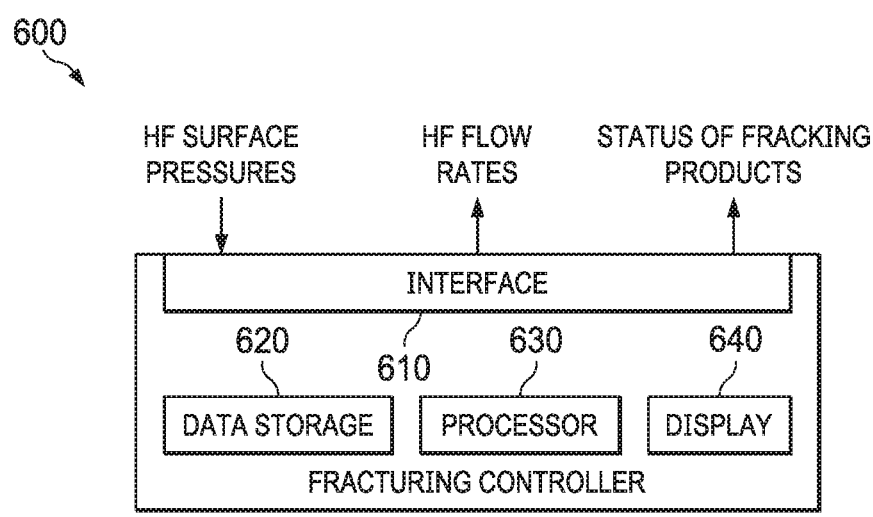
FIG. 6 illustrates a block diagram of an example of a fracturing controller constructed according to the principles of the disclosure.

FIG. 6 illustrates a block diagram of an example of a fracturing controller 600 constructed according to the principles of the disclosure. The fracturing controller 600 is configured to direct a fracturing system to conduct a fracturing process for a wellbore. The fracturing controller 600 can automatically control the fracturing process, or at least automatically control a portion of a fracturing process. For example, the fracturing controller 600 can automatically perform the method 300. The fracturing controller 600 includes an interface 610, a data storage 620, a processor 630, and a display 640.

The interface 610 is a communications interface that is configured to communicate data, i.e., transmit and receive data. As such, the interface 610 includes the necessary logic, ports, terminals, connectors, etc., to communicate data. The ports, terminals, connectors, may be conventional receptacles for communicating data via a communications network. As illustrated, the interface 610 can receive surface pressure measurements from a surface pressure meter, such as from surface pressure meter 154 of the HF well system 100 in FIG. 1. The surface pressure measurements can correspond to different flow rates that have been modified, such as described in the method 300. Changes to the HF flow rates can be instructed by the processor 630 and can be based on the number of fracture clusters in the wellbore. The measurements and settings can be communicated between the interface 610 to the surface pressure meter 154 and pump system via conventional communication systems used with a well system.

The data storage 620 is configured to store computer executable instructions to direct the operation of the processor 630 when initiated thereby. The data storage 620 includes memory, such as non-volatile memory. The data storage 620 can also store data, such as the corresponding surface flow rates and surface pressure measurements. The operating instructions may correspond to algorithms that provide the functionality of the operating schemes disclosed herein. For example, the operating instructions may correspond to the algorithm or algorithms that, when executed, automatically direct the operation of the processor 630 to perform a method of determining distribution of fracturing components in fracture clusters of a wellbore. Accordingly, the algorithm can direct determining flow rates for the fracture clusters employing the surface flow rates, the surface pressures, and a model representing flow distribution of the wellbore. The processor 630 can employ additional operating instructions from the data storage 620 to direct other fracturing processes.

The display 640 is configured to operate as a visual interface to provide a visual output of data. The display 640 can be a conventional display, such as employed with computing systems. The display 640 can provide the status of the cluster flow rates provided by the processor 630. For example, the display 640 can provide the graph 500

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects Disclosed Herein Include:

A. A method of determining distribution of fracturing components in fracture clusters of a wellbore, including: (1) modifying surface flow rates for pumping a fracturing component into the wellbore, (2) measuring surface pressures for the surface flow rates, and (3) determining flow rates for the fracture clusters employing the surface flow rates, the surface pressures, and a model representing flow distribution of the wellbore.

B. A fracturing controller for hydraulic fracturing of subterranean regions, including: (1) an interface configured to receive surface flow rates and corresponding surface pressures for pumping a fracturing component into a wellbore, wherein the surface flow rates are modified in a series of steps, and (2) a processor configured to determine flow rates for the fracture clusters employing the surface flow rates, the surface pressures, and a model representing flow distribution of the wellbore.

C. A computer program product having a series of operating instructions stored on a non-transitory computer-readable medium that directs a processor when executed thereby to perform operations to determine a distribution of fracture fluids in fracture clusters of a wellbore, the operations including: (1) receiving surface flow rates for pumping a fracture fluid into the wellbore, wherein the surface flow rates are modified in a series of steps, (2) receiving surface pressures measured for each of the series of steps, and (3) determining flow rates for the fracture clusters employing the surface flow rates, the surface pressures, and a model representing flow distribution of the wellbore.

Each of aspects A, B, and C can have one or more of the following additional elements in combination: Element 1: wherein the model is based on relationships that include a relationship of a cluster flow rate to a cluster entrance pressure, a relationship of a surface flow rate to the flow rates for each of the fracture clusters, and the relationship between a cluster entrance pressure to friction and hydrostatic pressure associated with the fracturing component. Element 2: wherein the determining the flow rates for the fracture clusters includes solving for time invariant coefficients of the model employing the surface flow rates and the surface pressures. Element 3: further comprising predicting future flow rates for the fracture clusters employing the model and the time invariant coefficients. Element 4: wherein the surface flow rates are modified a number of times that is greater than two times a number of the fracture clusters. Element 5: wherein the modifying occurs after breakdowns for are completed for a multi-cluster fracturing stage for the wellbore. Element 6: further comprising providing a status of the fracturing component in the fracture clusters based on the flow rates for the fracture clusters. Element 7: wherein the processor is configured to determine the flow rates by solving for time invariant coefficients of the model employing the surface flow rates and the surface pressures. Element 8: wherein the time invariant coefficients include a perforation loss coefficient and a tortuosity loss coefficient. Element 9: wherein the processor is further configured to predict future flow rates for the fracture clusters employing the model and the time invariant coefficients. Element 10: wherein the model is based on a set of non-linear equations that include an equation relating a cluster flow rate to a cluster entrance pressure and an equation relating a cluster entrance pressure to friction and hydrostatic pressure associated with the fracturing component. Element 11: wherein the model further includes a constraint between a surface flow rate and a summation of the flow rates for each of the fracture clusters. Element 12: wherein the processor is further configured to provide a status of the fracturing components in the fracture clusters based on the flow rates for the fracture clusters. Element 13: wherein the fracturing component is a fracture fluid having proppants. Element 14: wherein the model is represented by a set of non-linear equations that include an equation relating a cluster flow rate to a cluster entrance pressure, an equation relating a cluster entrance pressure to friction and hydrostatic pressure corresponding to the fracture fluid, and a constraint between a surface flow rate and a summation of the flow rates for each of the fracture clusters. Element 15: wherein the determining includes solving for time invariant coefficients of the model employing the surface flow rates and the surface pressures. Element 16: wherein the operations further include predicting future flow rates for the fracture clusters employing the model and the time invariant coefficients. Element 17: wherein the operations further include providing a status of the fracturing fluids in the clusters based on the flow rates for the fracture clusters.

What is claimed is:

1. A method of determining distribution of fracturing components in fracture clusters of a wellbore, comprising:
   modifying surface flow rates for pumping a fracturing component into the wellbore;
   measuring surface pressures for the surface flow rates; and
   determining flow rates for the fracture clusters employing the surface flow rates, the surface pressures, and a model representing flow distribution of the wellbore by solving for time invariant coefficients of the model employing the surface flow rates and the surface pressures, wherein the time invariant coefficients are selected from the group consisting of a perforation loss coefficient ($C_{p,i}$), a tortuosity loss coefficient ($C_{t,i}$), and an effective stress $\sigma_i$.

2. The method as recited in claim 1, wherein the model is based on relationships that include a relationship of a cluster flow rate to a cluster entrance pressure, a relationship of a surface flow rate to the flow rates for each of the fracture clusters, and the relationship between a cluster entrance pressure to friction and hydrostatic pressure associated with the fracturing component.

3. The method as recited in claim 1, further comprising predicting future flow rates for the fracture clusters employing the model and the time invariant coefficients.

4. The method as recited in claim 1, further comprising providing a status of the fracturing component in the fracture clusters based on the flow rates for the fracture clusters.

5. The method as recited in claim 1, wherein the modifying occurs after breakdowns are completed for a multi-cluster fracturing stage for the wellbore.

6. The method as recited in claim 1, wherein the surface flow rates are modified a number of times that is greater than two times a number of the fracture clusters.

7. A fracturing controller for hydraulic fracturing of subterranean regions, comprising:
   an interface configured to receive surface flow rates and corresponding surface pressures for pumping a fracturing component into a wellbore, wherein the surface flow rates are modified in a series of steps; and
   a processor configured to determine flow rates for the fracture clusters employing the surface flow rates, the surface pressures, and a model representing flow distribution of the wellbore by solving for time invariant coefficients of the model employing the surface flow rates and the surface pressures, wherein the time invariant coefficients are selected from the group consisting of a perforation loss coefficient ($C_{p,i}$), a tortuosity loss coefficient ($C_{t,i}$), and an effective stress ($\sigma_i$).

8. The fracturing controller as recited in claim 7, wherein the processor is further configured to predict future flow rates for the fracture clusters employing the model and the time invariant coefficients.

9. The fracturing controller as recited in claim 7, wherein the model is based on a set of non-linear equations that include an equation relating a cluster flow rate to a cluster entrance pressure and an equation relating a cluster entrance pressure to friction and hydrostatic pressure associated with the fracturing component.

10. The fracturing controller as recited in claim 9, wherein the model further includes a constraint between a surface flow rate and a summation of the flow rates for each of the fracture clusters.

11. The fracturing controller as recited in claim 7, wherein the processor is further configured to provide a status of the fracturing components in the fracture clusters based on the flow rates for the fracture clusters.

12. The fracturing controller as recited in claim 7, wherein the fracturing component is a fracture fluid having proppants.

13. A computer program product having a series of operating instructions stored on a non-transitory computer-readable medium that directs a processor when executed thereby to perform operations to determine a distribution of fracture fluids in fracture clusters of a wellbore, the operations comprising:
    receiving surface flow rates for pumping a fracture fluid into the wellbore, wherein the surface flow rates are modified in a series of steps;
    receiving surface pressures measured for each of the series of steps; and
    determining flow rates for the fracture clusters employing the surface flow rates, the surface pressures, and a model representing flow distribution of the wellbore by solving for time invariant coefficients of the model employing the surface flow rates and the surface pressures, wherein the time invariant coefficients are selected from the group consisting of a perforation loss coefficient ($C_{p,i}$), a tortuosity loss coefficient ($C_{t,i}$), and an effective stress ($\sigma_i$).

14. The computer program product as recited in claim 13, wherein the model is represented by a set of non-linear equations that include an equation relating a cluster flow rate to a cluster entrance pressure, an equation relating a cluster entrance pressure to friction and hydrostatic pressure corresponding to the fracture fluid, and a constraint between a surface flow rate and a summation of the flow rates for each of the fracture clusters.

15. The computer program product as recited in claim 13, wherein the operations further include predicting future flow rates for the fracture clusters employing the model and the time invariant coefficients.

16. The computer program product as recited in claim 13, wherein the operations further include providing a status of the fracturing fluids in the clusters based on the flow rates for the fracture clusters.

* * * * *